United States Patent
Khaire et al.

(10) Patent No.: US 11,971,071 B2
(45) Date of Patent: Apr. 30, 2024

(54) SENSOR BEARING UNIT AND ASSOCIATED APPARATUS

(71) Applicant: Aktiebolaget SKF, Gothenburg (SE)

(72) Inventors: Maruti Vitthal Khaire, Maharashtra (IN); Vignesh Dharmalingam, Vellore (IN); Sayali Madhav Apte, Mumbai (IN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/952,376

(22) Filed: Sep. 26, 2022

(65) Prior Publication Data

US 2023/0127089 A1  Apr. 27, 2023

(30) Foreign Application Priority Data

Oct. 27, 2021  (IN) .............................. 202141049069

(51) Int. Cl.
*F16C 33/58*  (2006.01)
*F16C 19/06*  (2006.01)
*F16C 41/00*  (2006.01)

(52) U.S. Cl.
CPC ............ *F16C 41/007* (2013.01); *F16C 19/06* (2013.01); *F16C 33/586* (2013.01); *F16C 2233/00* (2013.01)

(58) Field of Classification Search
CPC ...... F16C 19/06; F16C 33/586; F16C 35/063; F16C 35/073; F16C 41/007; F16C 2226/76; F16C 2233/00; G01P 3/443
See application file for complete search history.

(56) References Cited

U.S. PATENT DOCUMENTS 9,494,196 B2 * 11/2016 Sausset .................. G01P 3/443

FOREIGN PATENT DOCUMENTS

| DE | 102017218880 A1 * | 5/2018 | ............ F16C 41/007 |
| FR | 2884367 A1 * | 10/2006 | ............ F16C 33/586 |
| WO | WO-2013098583 A1 * | 7/2013 | ............ F16C 35/045 |
| WO | WO-2016188556 A1 * | 12/2016 | |

* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor (57) ABSTRACT

A sensor bearing unit includes a bearing having an inner ring and an outer ring centered on an axis, an impulse ring secured to the inner ring of the bearing, and a sensor device for detecting rotational parameters of the impulse ring including a sensor housing secured to the outer ring of the bearing and at least one sensor element supported by the sensor housing and cooperating with the impulse ring. The impulse ring is provided with an orientation lug extending axially on the side opposite to the inner ring of the bearing and intended to be located into a groove formed on the shaft of an associated apparatus.

10 Claims, 5 Drawing Sheets

SENSOR BEARING UNIT AND ASSOCIATED APPARATUS

CROSS-REFERENCE TO RELATED APPLICATIONS

This application claims priority to Indian Patent Application no. 202141049069, filed Oct. 27, 2021, the contents of which is fully incorporated herein by reference.

FIELD OF THE INVENTION

The present invention relates to a sensor bearing unit comprising a bearing, an impulse ring and a sensor device.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

A sensor bearing unit generally comprises a bearing, an impulse ring secured to the rotatable inner ring of the bearing, and a sensor device for sensing the angular position of the impulse ring with respect to the fixed outer ring of the bearing.

The sensor device is provided with a sensor element facing the impulse ring in order to determine the angular position, speed and direction of the rotatable inner ring. The sensor device is also provided with a sensor housing supporting the sensor element and secured to the outer ring of the bearing.

A sensor bearing unit may be used for example in a motor, such as a permanent magnet synchronous motor or a brushless motor, for providing information regarding the position of the motor's rotor with respect to the motor's stator windings. The positional information allows for proper commutation and control of the stator windings.

Therefore, it is very important to angularly align the rotor magnet with the impulse ring secured to the inner ring of the sensor bearing unit. However, during motor assembly, there is a significant risk that the rotor magnet does not align with the impulse ring since this operation is complex to achieve.

If the mechanical alignment is not done at the time of assembly, an electronic compensation must be done when processing the signal in motor controller. This process is time consuming and required trained professional.

One aim of the present invention is to overcome these drawbacks.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The invention relates to a sensor bearing unit provided with a bearing comprising an inner ring and an outer ring centered on an axis, the inner ring being intended to be mounted on the shaft of an associated apparatus, with an impulse ring secured to the inner ring of the bearing, and with a sensor device for detecting rotational parameters of the impulse ring comprising a sensor housing secured to the outer ring of the bearing and at least one sensor element supported by the sensor housing and cooperating with the impulse ring.

According to a general feature, the impulse ring is provided with an orientation lug extending axially on the side opposite to the inner ring of the bearing and intended to be located into a groove formed on the shaft of the associated apparatus. With such design, the mounting of the bearing of the sensor bearing unit on the associated shaft with the predetermined angular position may be done easily. This arrangement also allows easy assembly as well as magnet position alignment. Besides, after mounting, the orientation lug of the impulse ring engaged into the groove of the associated shaft prevents angular movement of the inner ring of the bearing relative to the shaft by abutment in circumferential direction with the lateral walls of the groove. The impulse ring may be provided with a radial portion axially abutting against a lateral face of the inner ring, the orientation lug protruding axially relative to the radial portion. The radial portion of the impulse ring may abut directly against the lateral face of the inner ring, or indirectly with interposition of an element such as a washer for example.

Advantageously, the radial portion of the impulse ring is provided with at least one axial protrusion engaged into a complementary axial recess provided on the lateral face of the inner ring. Alternatively, the lateral face of the inner ring may be provided with at least one axial protrusion engaged into a complementary axial recess provided on the radial portion of the impulse ring. With such disposition, the angular position of the impulse ring with respect to the inner ring of the bearing is predetermined.

Preferably, the sensor device further comprises a printed circuit board supporting the sensor element and secured to an axial portion of the sensor housing, the axial portion of the sensor housing being provided with at least one radial protrusion engaged into a complementary radial recess provided on the printed circuit board. Alternatively, the printed circuit board may be provided with at least one radial protrusion engaged into a complementary radial recess provided on the axial portion of the sensor housing. This leads to obtain a predetermined angular position of the printed circuit board with respect to the housing and to the outer ring of the bearing.

In one advantageous embodiment, the sensor housing of the sensor device is provided with an outer mounting portion radially surrounding the outer surface of the outer ring of the bearing, the mounting portion of the sensor housing being provided with at least a radial protrusion engaged into a complementary radial recess provided on the outer surface of the outer ring of the bearing. Alternatively, this outer surface of the outer ring may be provided with at least one radial protrusion engaged into a complementary radial recess provided on the mounting portion of the sensor housing. With such disposition, the angular position of the sensor housing relative to the outer ring of the bearing is predetermined. Otherwise, with the provision of the radial protrusions and the axial protrusion, the complete sensor bearing unit may be mounted on the associated shaft in a predetermined angular orientation. For example, the radial protrusions, the axial protrusion and the orientation lug of the impulse ring may be disposed in one same radial plane passing through the axis of the bearing.

In a first design, the orientation lug and the impulse ring of the sensor device are separate parts. The orientation lug may comprise a mounting portion secured to the impulse ring, and an axial portion axially protruding relative to the mounting portion and intended to be located into the shaft groove of the associated apparatus. Alternatively, the orientation lug may only comprise the axial portion.

In a second alternative design, the orientation lug and the impulse ring are made into one part. In this case, the orientation lug may for example only comprise the axial portion. In one embodiment, the sensor element of the sensor device axially faces the impulse ring. Alternatively, the sensor element may radially face the impulse ring. In one embodiment, the impulse ring is made of metal and provided with alternating teeth and apertures, the sensor element of the sensor device being capable to sense the metal impulse ring teeth and apertures.

The invention also relates to an apparatus comprising a rotating shaft and a sensor bearing unit as previously defined, wherein the inner ring of the bearing is fixed on the rotating shaft with the orientation lug of the impulse ring engaged inside a groove formed on the shaft. The apparatus may be an electric motor such as a permanent magnet synchronous motor or a brushless motor.

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of a specific embodiment given by way of a non-limiting example and illustrated by the appended drawings on which.

DETAILED DESCRIPTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The sensor bearing unit 10 represented on FIG. 1 is adapted to equip an apparatus such as a motor, a brake system, a suspension system, or any rotating machine, in particular for an automotive vehicle or a two-wheeled vehicle.

Figure 2:
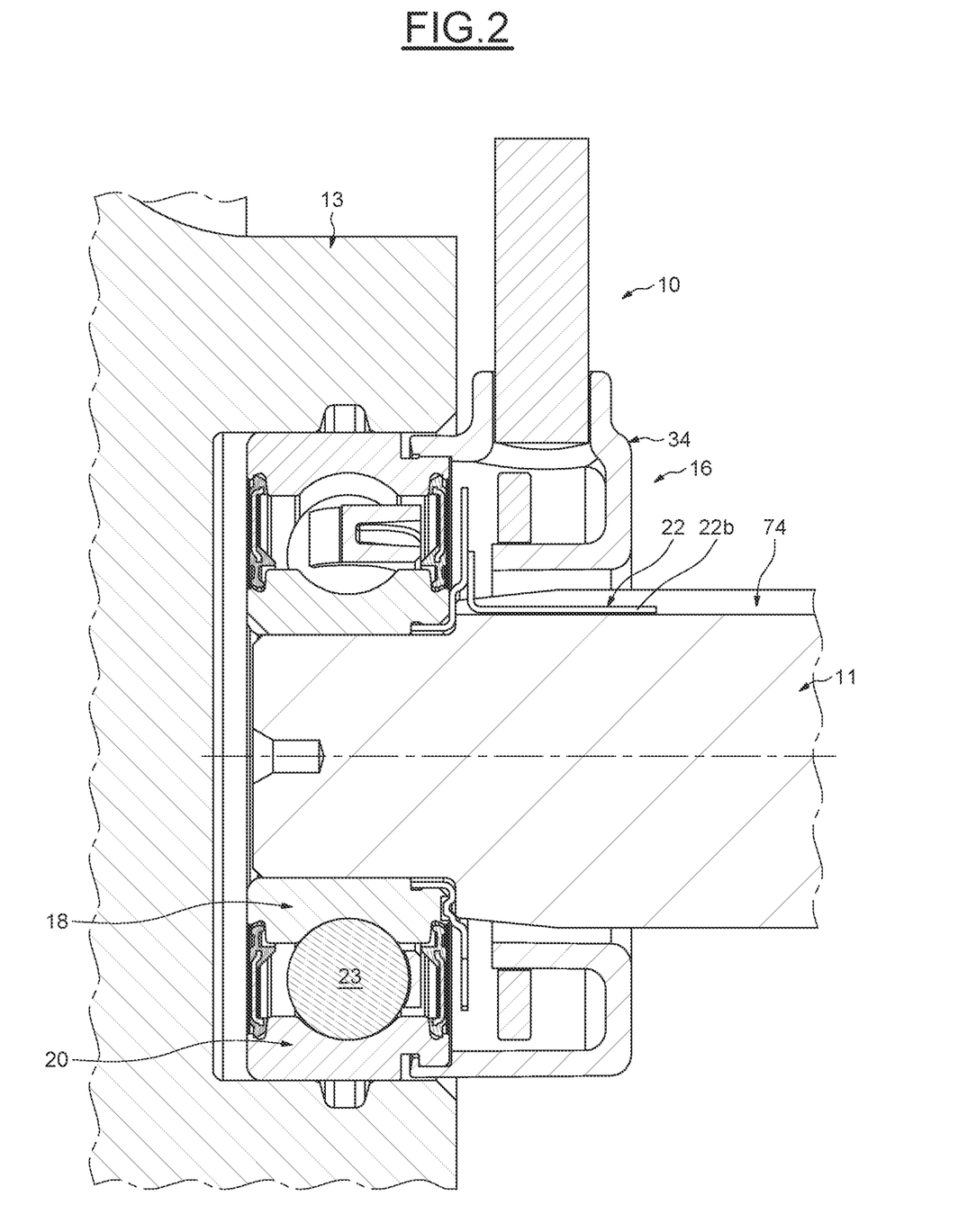
FIG. 2 is a partial axial section view of an apparatus provided with the sensor bearing unit of FIG. 1.

Such an apparatus is shown partially on FIG. 2 and is provided with a rotating shaft 11 and a non-rotation casing 13. If the apparatus is an electric motor, a rotor is secured to the shaft 11 and a stator is secured to the casing 13. The sensor bearing unit 10 is mounted on the shaft 11 and into the casing 13.

Figure 1:
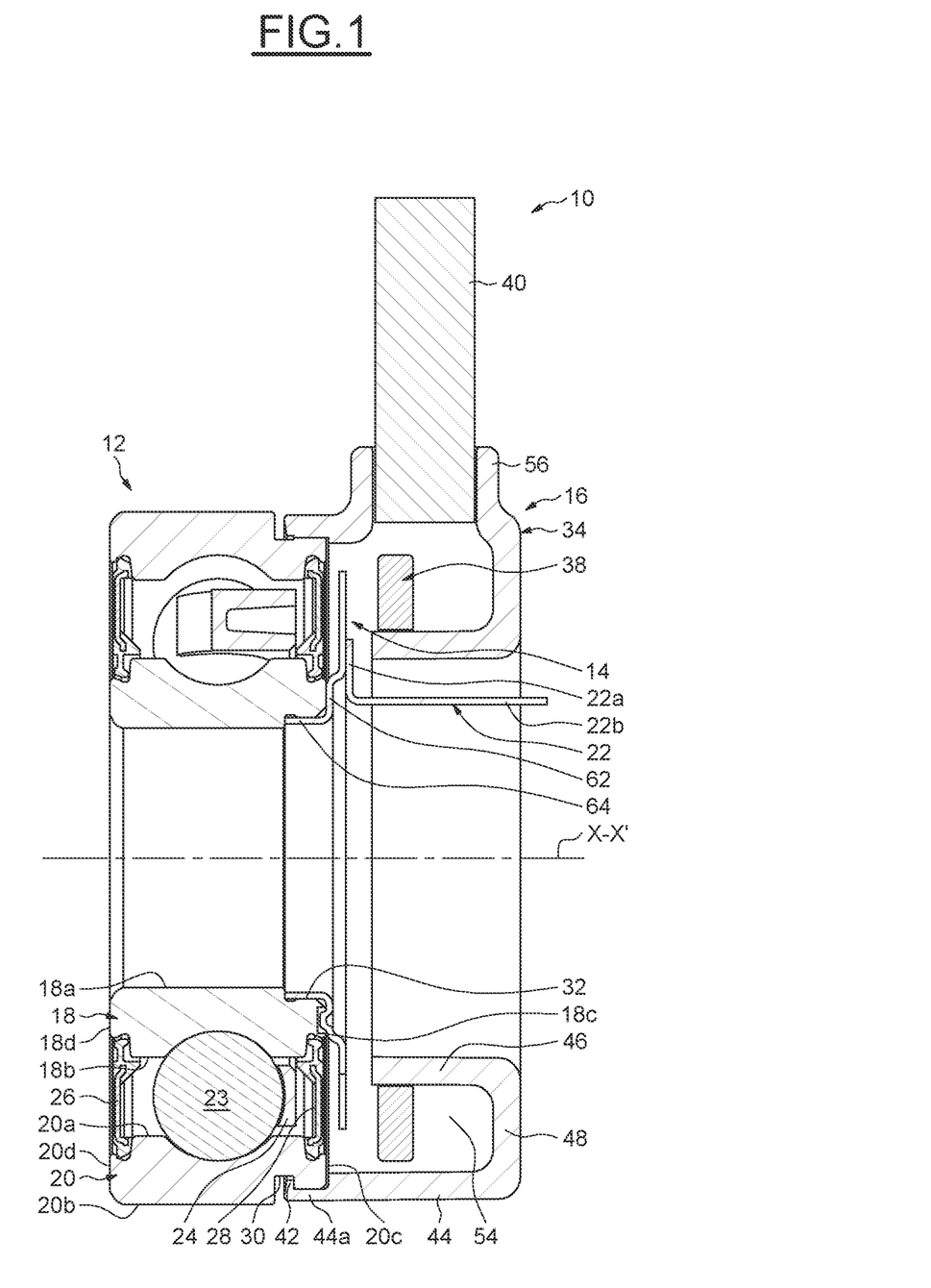
FIG. 1 is an axial section view of a sensor bearing unit according to an example of the invention.

As shown on FIG. 1, the sensor bearing unit 10 comprises a bearing 12, and an impulse ring 14 and a sensor device 16 mounted on the bearing. The bearing 12 is intended to be mounted on the shaft 11 (FIG. 2) of the apparatus for tracking the rotation of the shaft.

The bearing 12 comprises an inner ring 18 and an outer ring 20. The inner and outer rings 18, 20 are concentric and extend axially along the bearing rotation axis X-X' which runs in an axial direction. The outer ring 20 radially surrounds the inner ring 18. The inner and outer rings 18, 20 are made of steel.

As will be described later, the impulse ring 14 is secured to the inner ring 18 and the sensor device 16 is secured to the outer ring 20. As will also be described later, the impulse ring 14 is provided with an orientation lug 22 for aligning with the shaft 11 (FIG. 2) of the apparatus.

In the illustrated example, the bearing 12 also comprises a row of rolling elements 23, which are provided here in the form of balls, interposed between raceways (not referenced) formed on the inner and outer rings 18, 20.

The bearing 10 also comprises a cage 24 for maintaining the regular circumferential spacing of the rolling elements 23. The bearing 10 further comprises seals 26, 28 radially disposed between the inner and outer rings 18, 20 to define a closed space inside which the rolling elements 23 are arranged.

The inner ring 18 of the bearing is mounted on the outer surface of the shaft 11 (FIG. 2) of the apparatus. The inner ring 18 is intended to rotate while the outer ring 20 is intended to be fixed. The outer ring 20 is mounted into a bore of the fixed casing 13 of the apparatus.

The outer ring 20 is provided with a cylindrical inner surface or bore 20a and with an outer cylindrical surface 20b which is radially opposite to the bore 20a. In the illustrated example, a toroidal circular raceway for the rolling elements 23 is formed from the bore 20a, the raceway being directed radially inwards. The outer ring 20 is also provided with two opposite radial lateral faces 20c, 20d which axially delimit the bore 20a and the outer surface 20b of the ring.

A groove 30 is formed on the outer surface 20b of the outer ring. The groove 30 is oriented radially outwards. The groove 30 extends radially inwards from the outer surface 20b of the outer ring. In the illustrated example, the groove 30 has an annular form.

The groove 30 is axially delimited by two side walls axially facing each other. In the illustrated example, the outer surface 20b of the outer ring has a stepped shape. The outer surface 20b is provided with a first cylindrical portion and with a second cylindrical portion which is radially offset inwards with respect to the first cylindrical portion. The groove 30 is axially interposed between the first and second cylindrical portions.

Similarly to the outer ring 20, the inner ring 18 is provided with a cylindrical inner surface or bore 18a and with an outer cylindrical surface 18b which is radially opposite to the bore 18a. In the illustrated example, a toroidal circular raceway for the rolling elements 23 is formed from the outer surface 18b, the raceway being directed radially outwards. The inner ring 18 is also provided with two opposite radial lateral faces 18c, 18d which axially delimit the bore 18a and the outer surface 18b of the ring.

The inner ring 18 further comprises a cylindrical groove 32 made in the bore 18a. The groove 32 is centered on the axis X-X'. Diameter of bore 18a is smaller than diameter of groove 32. The groove 32 opens on the lateral face 18c of the inner ring.

As previously mentioned, the sensor device 16 is secured to the outer ring 20 of the bearing. The sensor device comprises a sensor body or housing 34 and sensor elements (not illustrated) supported by the sensor housing 34.

The sensor device 16 also comprises a printed circuit board 38 secured to the sensor housing 34 and supporting the sensor elements. In the illustrated example, the sensor device 16 also comprises a connecting cable 40 for transmitting sensing data.

The sensor housing 34 has an annular form. In the illustrated example, the sensor housing 34 is secured into the groove 30 formed on the outer surface 20b of the outer ring. The sensor housing 34 is provided with an annular hook 42 engaged inside the groove 30 to axially retain the sensor housing 34 relative to the outer ring. The hook 42 extends radially inwards. In the illustrated example, the sensor housing 34 is provided with an annular hook 42. Alternatively, the sensor housing 34 may be provided with a plurality of hooks 42 spaced apart in the circumferential direction, preferably regularly. Alternatively, it could be possible to foresee another fixing means to secure the sensor housing on the outer ring 20 of the bearing.

The sensor housing 34 comprises an annular outer axial portion 44 provided with the annular hook 42, an annular inner axial portion 46 and an annular radial portion 48 extending between the outer and inner axial portions. The outer and inner axial portions 44, 48 are concentric and coaxial with the axis X-X'. The sensor housing 34 is concentric with the axis X-X'.

The outer axial portion 44 of the sensor housing radially surrounds the inner portion 46. The outer axial portion 44 extends axially the radial portion 48 towards the bearing 12. The outer axial portion 44 extends axially a large-diameter edge of the radial portion 48.

A part 44a of the outer axial portion 44 radially surrounds the outer surface 20b of the outer ring. The hook 42 extend radially inwards from this part 44a. The part 44a of the outer axial portion 44 radially comes into contact with the outer surface 20b of the outer ring. The part 44a radially comes into contact with the second cylindrical portion of the outer surface. The part 44a is radially offset inwards with respect to the first cylindrical portion of the outer surface of the outer ring. In the illustrated example, the outer axial portion 44 is entirely radially offset inwards with respect to the first cylindrical portion.

Figure 3:
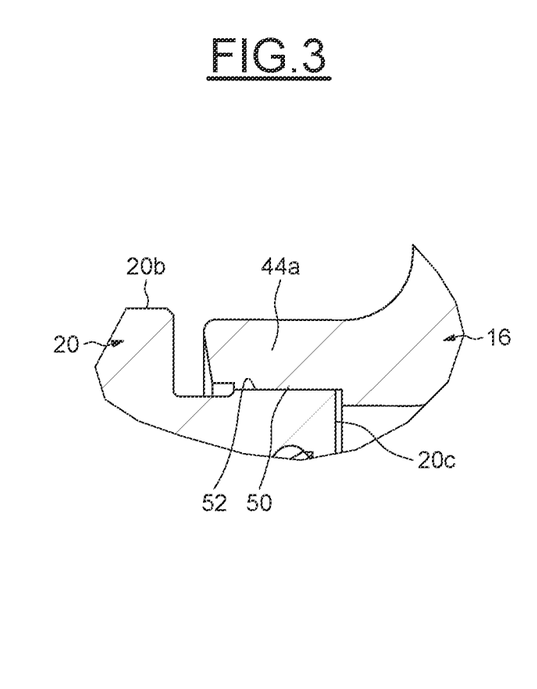
FIGS. 3 and 4 are detail views of FIG. 1.

As shown more clearly on FIG. 3, the part 44a of the outer axial portion 44 comprises a protrusion 50 extending radially inwards toward the outer surface 20b of the outer ring. The protrusion 50 extends radially inwards from the bore of the part 44a. The protrusion 50 extends in the circumferential direction over a limited angular sector. For example, the circumferential dimension of the protrusion 50 may range between 5° and 10°. Alternatively, another circumferential dimension of the protrusion 50 may be provided. The protrusion 50 is axially spaced apart from the hook 42. The protrusion 50 protrudes radially inwards relative to the hook 42. In the illustrated example, the protrusion 50 has in cross-section a convex shape. Alternatively, the protrusion 50 may have other shapes, for example a square shape or a rectangular shape.

The outer surface 20b of the outer ring of the bearing comprises a recess 52 inside which is engaged the protrusion 50 and being of complementary shape. The recess 52 extends radially inwards from the outer surface 20b of the outer ring. The recess 52 is oriented radially outwards.

Any relative rotation of the sensor device 16 relative to the outer ring 20 of the bearing is prevented by the abutment of the protrusion 50 with the recess 52.

The protrusion 50 of the sensor housing 34 forms local anti-rotation means cooperating by circumferential contact with the recess 52 of the outer ring 20 which forms local complementary anti-rotation means. Alternatively, it could be possible to foresee an inverted disposition of the protrusion 50 and the recces 52, i.e. the recess provided on the outer axial portion 44 of the sensor housing and the protrusion provided on the outer surface 20b of the outer ring.

Referring once again to FIG. 1, the outer axial portion 44 of the sensor housing axially protrudes towards the bearing 12 with regard to the inner axial portion 46. The inner axial portion 46 defines the bore of the sensor housing 34. The inner axial portion 46 extends axially the radial portion 48 towards the bearing 12. The inner axial portion 46 extends axially a small-diameter edge of the radial portion 48. The inner axial portion 46 remains axially spaced apart from the bearing 12 and the impulse ring 14.

The sensor housing 34 defines an annular space 54 axially oriented towards the bearing 12. The space 54 is radially delimited by the outer and inner axial portions 44, 46. The space 54 is axially delimited by the radial portion 48.

In the illustrated example, the sensor housing 34 also comprises a cable output 56 inside which is engaged the cable 40. The cable output 56 forms a protruding portion extending radially outwards from the outer surface of the sensor housing 34. In this example, the sensor device 16 is provided with the connecting cable 40 for transmitting sensing data. Alternatively, the sensor device 16 may be deprived of such connecting cable in case of wireless sensor elements. In this case, the sensor housing 34 do not comprise the cable output 56.

The sensor body 34 is here made in one part. The sensor body 30 is made of a synthetic material. For example, the sensor body 34 may be made of PA 6.6 or PBT. Alternatively, the sensor body 34 can also be made from other materials, for example such as steel. Alternatively, the sensor body 34 may be made in multiple parts.

The printed circuit board 38 is secured to the sensor housing 34. The printed circuit board 38 is housed inside the space 54 defined by the sensor housing 34. The printed circuit board 38 is secured to the inner axial portion 46 of the sensor body. The printed circuit board 38 has an annular shape.

Figure 7:
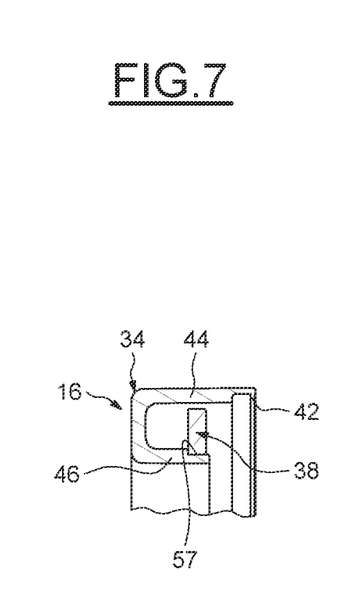
FIG. 7 is a section on VII-VII of FIG. 5.

As shown on FIG. 7, an annular groove 57 is formed on the outer surface of the inner axial portion 46 of the sensor body. The groove 57 is oriented radially outwards. The groove 57 is provided at the axial end of the inner axial portion 46. The printed circuit board 38 is mounted inside the groove 57. The printed circuit board 38 axially abuts against a radial wall of the groove 57.

The inner axial portion 46 comprises two protrusions 58 (FIG. 5) extending radially inwards from the bottom of the groove 57 toward the printed circuit board 38. The protrusions 58 extend radially outwards. In the illustrated example, the two protrusions 58 are disposed in the same radial plane passing through the axis of the sensor body. Alternatively, the inner axial portion 46 may comprise only one protrusion 58 or three or more protrusions. The protrusions 58 and the protrusion 50 of the sensor housing 34 are disposed in the same radial plane passing through the axis of the sensor body.

Figure 5:
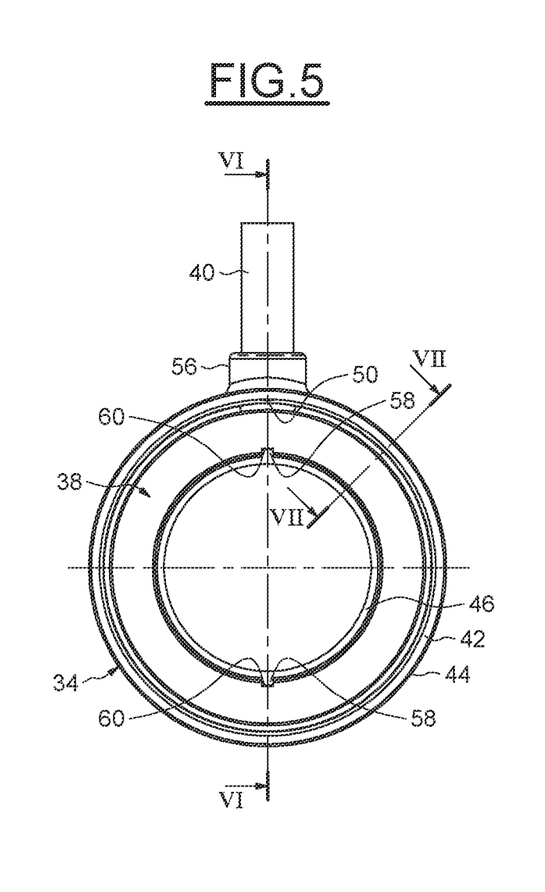
FIG. 5 is a front view of a sensor device of the sensor bearing unit of FIG. 1.
Figure 6:
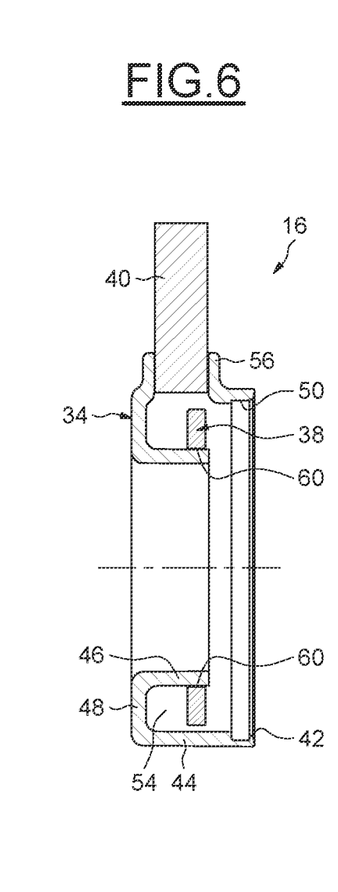
FIG. 6 is a section on VI-VI of FIG. 5.

Each protrusion 58 extends in the circumferential direction over a limited angular sector. For example, the circumferential dimension of each protrusion 58 may range between 5° and 10°. In the illustrated example, each protrusion 58 has in cross-section a rectangular shape Alternatively, each protrusion 58 may have other shapes, for example a square shape or a convex shape.

The bore of the printed circuit board 38 is provided with two recesses 60 inside which are engaged the protrusions 58 and being of complementary shape. Each protrusion 58 protrudes into one of the recesses 60. Each recess 60 extends radially outwards from the bore of the printed circuit board 38. The recess 60 is oriented radially inwards.

Any relative rotation of the printed circuit board 38 relative to sensor housing 34 is prevented by the abutment of the protrusions 58 with the recesses 60. The protrusions 58 of the sensor housing 34 form local anti-rotation means cooperating by circumferential contact with the recesses 60 of the printed circuit board 38 which form local complementary anti-rotation means. Alternatively, it could be possible to foresee an inverted disposition of the protrusions 58 and the recesses 60, i.e. the recesses provided on the inner axial portion 46 of the sensor housing and the protrusions provided on the printed circuit board 38.

As previously mentioned, in the illustrated example, the printed circuit board 38 is secured to the inner axial portion 46 of the sensor body Alternatively, the printed circuit board 38 may be secured to the outer axial portion 44 of the sensor body.

The sensor elements are supported by the printed circuit board 38 which is itself supported by the sensor housing 34. As will be described later, the sensor elements are mounted on the printed circuit board 38 axially on the side of the impulse ring 14.

Referring once again to FIG. 1 and as previously mentioned, the impulse ring 14 is secured to the inner ring 18 of the bearing. The impulse ring 14 is secured into the bore 18a of the inner ring. The impulse ring 14 is secured into the groove 32 formed on the bore 18a. In the disclosed example, the impulse ring 14 is made in one part. The impulse ring 14 is made of metal.

Figure 8:
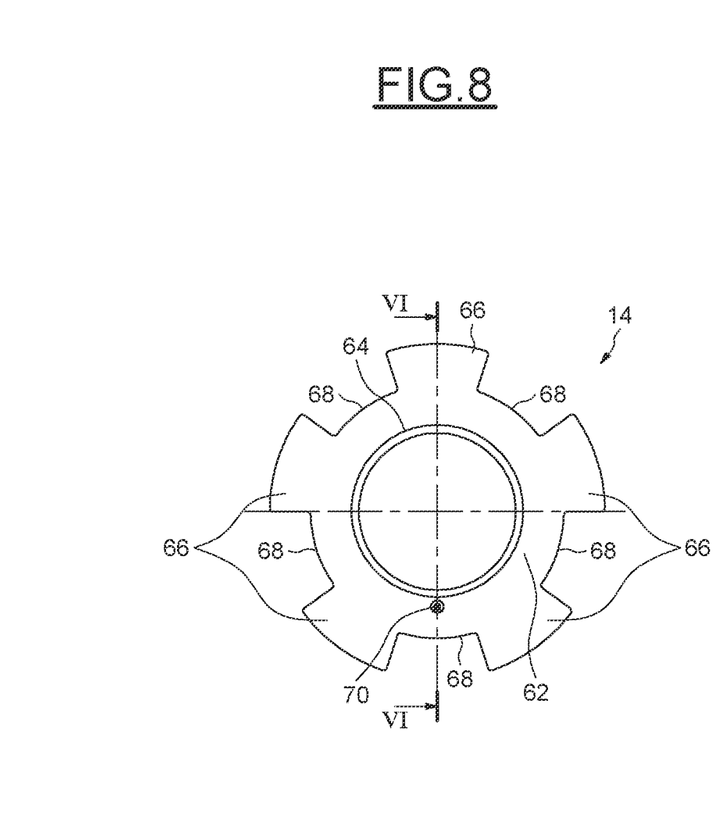
FIG. 8 is a front view of an impulse ring of the sensor bearing unit of FIG. 1.
Figure 9:
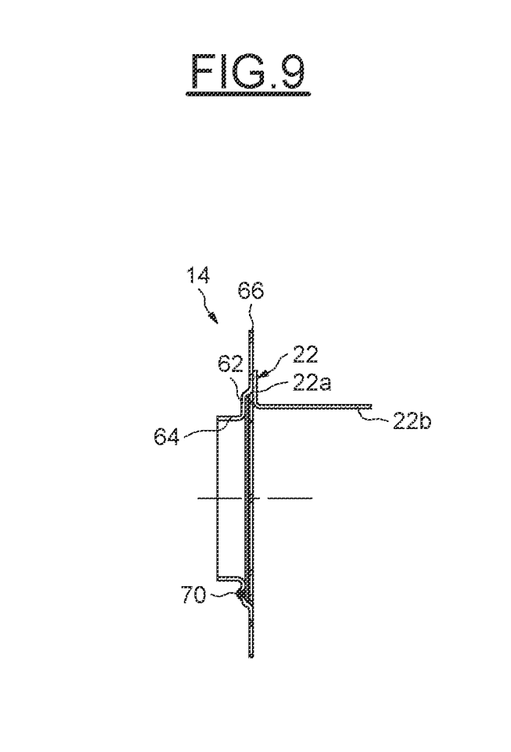
FIG. 9 is a section on IX-IX of FIG. 8.

As shown on FIGS. 1, 8 and 9, the impulse ring 14 comprises an annular radial portion 62, and an annular inner axial portion 64 extending axially from the radial portion 62. The axial portion 64 extends axially inwards the radial portion 62. The axial portion 64 extends axially a small-diameter edge of the radial portion 62. In the illustrated example, the radial portion 62 has a stepped shape.

The impulse ring 14 is axially mounted against the lateral face 18c of the inner ring. The radial portion 62 of the impulse ring axially abuts against the lateral face 18c. The axial portion 64 is mounted into the groove 32 formed on the bore 18a. The axial portion 64 is secured into the groove 32, for example by press-fitting.

The impulse ring 14 is also provided with a plurality of teeth 66 at its periphery. The teeth 66 are regularly spaced apart in the circumferential direction. A recess or aperture 68 is provided between each pair of successive teeth 66. Hence, the impulse ring 14 is provided with alternating teeth 66 and apertures 68.

Figure 4:
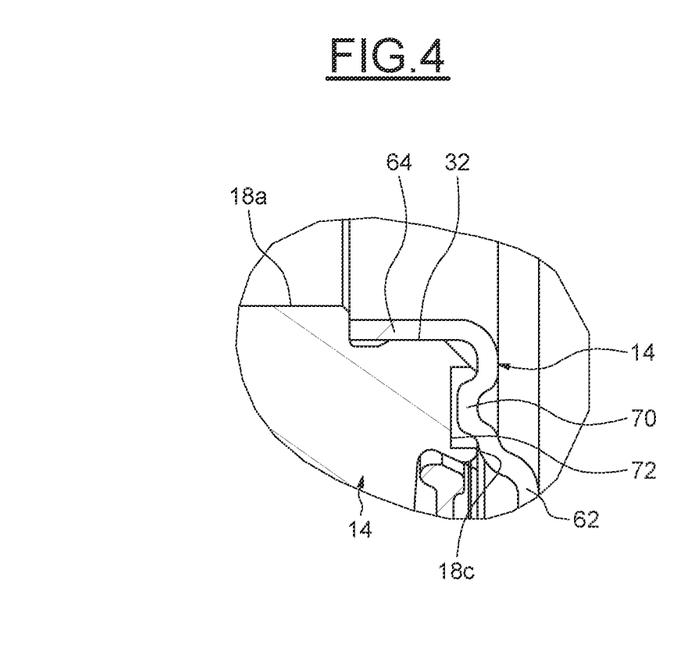

As shown on FIGS. 4 and 9, the radial portion 62 of the impulse ring is provided with a protrusion 70 extending axially inwards toward the inner ring 18 of the bearing. The protrusion 70 extends axially towards the lateral face 18c of the inner ring. The protrusion 70 extends in the circumferential direction over a limited angular sector. For example, the circumferential dimension of the protrusion 70 may range between 5° and 10°. In the illustrated example, the protrusion 70 has in cross-section a convex shape. Alternatively, the protrusion 70 may have other shapes, for example a square shape or a rectangular shape.

The lateral face 18c of the inner ring of the bearing comprises a recess 72 inside which is engaged the protrusion 70 and being of complementary shape. The recess 72 extends axially inwards from the lateral face 18c of the inner ring. The recess 72 is oriented axially outwards.

Any relative rotation of the impulse ring 14 relative to the inner ring 18 of the bearing is prevented by the abutment of the protrusion 70 with the recess 72. The protrusion 70 of the impulse ring 14 forms local anti-rotation means cooperating by circumferential contact with the recess 72 of the inner ring 18 which forms local complementary anti-rotation means. Alternatively, it could be possible to foresee an inverted disposition of the protrusion 70 and the recces 27, i.e. the recess provided on the radial portion 62 of the impulse ring and the protrusion provided on the lateral face 18c of the inner ring.

As previously mentioned, each sensor element of the sensor device 16 is mounted on the printed circuit board 38 axially on the side of the impulse ring 14. Each sensor element axially faces the impulse ring 14. The sensor elements are disposed on the same diameter on the printed circuit board 38. Each sensor element axially faces one of the teeth 66 or apertures 68 of the impulse ring. The sensor elements are regularly spaced apart in the circumferential direction. For example, the sensor device 16 may comprise three sensor elements. Alternatively, a different number of sensor elements may be foreseen, for example one or two sensor elements or at least four sensor elements.

Preferably, the sensor elements use induction technology. Each sensor element may include an inductive switch sensor such as a sensing coil. The switch of each sensor element is triggered by the metal impulse ring 14. The teeth 66 and apertures 68 of the impulse ring are used as differential inductance field reference.

As an alternative, the impulse ring 14 and the sensors element may use any other suitable technology instead of induction technology. For example, optic technology or magnetic technology may be implemented. In case of magnetic technology, the impulse ring 14 may include alternating North and South poles and the sensor elements may include Hall-effect sensors.

As previously mentioned, and as shown on FIGS. 1 and 2, the impulse ring 14 is provided with the orientation lug 22. The lug 22 is foresee to prevent angular movement of the inner ring 16 of the bearing relative to the shaft 11 of the associated apparatus during assembly.

In the illustrated example, the lug 22 is secured to the impulse ring 14. The lug 22 is secured to the radial portion 62 of the impulse ring 14. The lug 22 comprises a mounting radial portion 22a secured to the impulse ring 14, and an axial portion 22b extending axially from the radial portion 22a. The axial portion 22b extends axially the radial portion 22a. The axial portion 22b extends axially a small-diameter edge of the radial portion 22a. The radial portion 22a is secured to the impulse ring 14 by any appropriate means, for example by welding. In the disclosed example, the lug 22 has a L-shape in cross-section. The lug 22 is made of metal.

In the disclosed example, the lug 22 is a part distinct from the impulse ring 14. Alternatively, the impulse ring 14 and the lug 22 may be made into one part. In this case, the lug 22 may only comprise the axial portion 22b.

The axial portion 22b of the lug extends axially on the side opposite to the inner ring 18 of the bearing. The axial portion 22b extends into the bore of the sensor housing 34. The lug 22 remains axially and radially spaced apart from the sensor housing 34.

The axial portion 22b of the lug protrudes radially into a groove 74 formed on the outer surface of the shaft 11. The axial portion 22b of the lug extends axially into the groove 74. The groove 74 extends axially on the outer surface of the shaft 11. The groove 74 is oriented radially outwards towards the sensor housing 34. The groove 74 extends in the circumferential direction over a limited angular sector. The circumferential dimension of the groove 74 is substantially equal to the one of the axial portion 22b of the lug.

Any relative rotation of the impulse ring 14 and the inner ring 18 of the bearing relative to the shaft 11 of the apparatus is prevented during assembly by the abutment of the lug 22 with the lateral walls of the groove 74 of the shaft.

The protrusions 50, 58 of the sensor housing, the protrusion 70 of the impulse ring as well as the axial portion 22b of the lug are disposed in one same radial plane passing through the axis X-X' of the bearing.

In the disclosed example, the groove 74 is formed on the outer surface of the shaft 11 and opens on the frontal end face of the shaft. Alternatively, the groove 74 may remain axially spaced apart from the frontal end face. In this case, the groove has the form of a slot.

In the illustrated example, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

The invention claimed is:

1. A sensor bearing unit comprising:
a bearing comprising an inner ring and an outer ring centered on an axis, the inner ring configured to be mounted on a shaft of an associated apparatus,
an impulse ring secured to the inner ring of the bearing, and
a sensor device for detecting rotational parameters of the impulse ring comprising a sensor housing secured to the outer ring of the bearing and at least one sensor element supported by the sensor housing and cooperating with the impulse ring, wherein
the impulse ring is provided with an orientation lug extending axially on the side opposite to the inner ring of the bearing and intended to be located into a groove formed on the shaft of the associated apparatus.

2. The sensor bearing unit according to claim 1, wherein the impulse ring is provided with a radial portion axially abutting against a lateral face of the inner ring, the orientation lug protruding axially relative to the radial portion.

3. The sensor bearing unit according to claim 2, wherein the radial portion of the impulse ring is provided with at least one axial protrusion engaged into a complementary axial recess provided on the lateral face of the inner ring or vice versa.

4. The sensor bearing unit according to claim 1, wherein the sensor device further comprises a printed circuit board supporting the sensor element and secured to an axial portion of the sensor housing, the axial portion being provided with at least one radial protrusion engaged into a complementary radial recess provided on the printed circuit board or vice versa.

5. The sensor bearing unit according to claim 1, wherein the sensor housing of the sensor device is provided with an outer mounting portion radially surrounding the outer surface of the outer ring of the bearing, the mounting portion being provided with at least one radial protrusion engaged into a complementary radial recess provided on the outer surface of the outer ring of the bearing or vice versa.

6. The sensor bearing unit according to claim 5, wherein a radial portion of the impulse ring is provided with at least one axial protrusion engaged into a complementary axial recess provided on the lateral face of the inner ring or vice versa, and wherein the at least one radial protrusion, the axial protrusion and the orientation lug of the impulse ring are disposed in one same radial plane passing through the axis of the bearing.

7. The sensor bearing unit according to claim 1, wherein the orientation lug and the impulse ring of the sensor device are separate parts.

8. The sensor bearing unit according to claim 7, wherein the orientation lug comprises a mounting portion secured to the impulse ring, and an axial portion axially protruding relative to the mounting portion and intended to be located into the shaft groove of the associated apparatus.

9. The sensor bearing unit according to claim 1, wherein the impulse ring of the sensor device is made of metal and provided with alternating teeth and apertures, the sensor element of the sensor device being capable to sense the metal impulse ring teeth and apertures.

10. An apparatus comprising:
a rotating shaft, and
a sensor bearing unit a bearing comprising an inner ring and an outer ring centered on an axis, the inner ring configured to be mounted on a shaft of an associated apparatus, an impulse ring secured to the inner ring of the bearing, and a sensor device for detecting rotational parameters of the impulse ring comprising a sensor housing secured to the outer ring of the bearing and at least one sensor element supported by the sensor housing and cooperating with the impulse ring, wherein the impulse ring is provided with an orientation lug extending axially on the side opposite to the inner ring of the bearing and intended to be located into the groove formed on the shaft of the associated apparatus, and wherein the inner ring of the bearing is fixed on the rotating shaft with the orientation lug of the impulse ring engaged inside a groove formed on the shaft.

* * * * *